US012124258B2

(12) United States Patent
Murch et al.

(10) Patent No.: US 12,124,258 B2
(45) Date of Patent: **\*Oct. 22, 2024**

(54) MOBILE DEVICE APPLICATION-BASED AIRCRAFT DATA STORAGE AND COMMUNICATION SYSTEM

(71) Applicant: Cirrus Design Corporation, Duluth, MN (US)

(72) Inventors: Austin Matthew Murch, Esko, MN (US); David Andrew Rathbun, Hermantown, MN (US); Bradley T. Cyr, Duluth, MN (US)

(73) Assignee: Cirrus Design Corporation

( * ) Notice: Subject to any disclaimer, the term of this patent is extended or adjusted under 35 U.S.C. 154(b) by 0 days.

This patent is subject to a terminal disclaimer.

(21) Appl. No.: 18/447,477

(22) Filed: Aug. 10, 2023

(65) Prior Publication Data

US 2023/0384785 A1 Nov. 30, 2023

Related U.S. Application Data

(63) Continuation of application No. 17/590,598, filed on Feb. 1, 2022, now Pat. No. 11,762,383, which is a
(Continued)

(51) Int. Cl.
*G05D 1/00* (2006.01)
*B64D 45/00* (2006.01)
*H04L 12/40* (2006.01)

(52) U.S. Cl.
CPC .......... *G05D 1/0022* (2013.01); *B64D 45/00* (2013.01); *H04L 12/40039* (2013.01); *B64D 2045/0085* (2013.01); *H04L 2012/4028* (2013.01)

(58) Field of Classification Search
CPC .......... G05D 1/0022; B64D 45/00; B64D 2045/0085; H04L 12/40039;
(Continued)

(56) References Cited

U.S. PATENT DOCUMENTS 6,181,990 B1    1/2001   Grabowsky et al.
6,577,419 B1    6/2003   Hall et al.
(Continued)

FOREIGN PATENT DOCUMENTS

CN    105373115 A    3/2016
EP      2020764 A2    2/2009
(Continued)

OTHER PUBLICATIONS

Airsync, "AirSync Kit—Gen 2—with 1 year Entry Tier Service", Product Description Sheet, https://air-sync.com/products/airsync, (2020), 2 pp.
(Continued)

*Primary Examiner* — Muhammad Shafi
(74) *Attorney, Agent, or Firm* — FAEGRE DRINKER BIDDLE & REATH (57) ABSTRACT

An aircraft comprising a first power supply such as a battery, avionics including a plurality of sensors that provide aircraft parameter information, a transceiver and a gateway. The gateway includes a processing system and is coupled to the first power supply, avionics and transceiver. The gateway is configured to operate in a first mode to receive from the transceiver a remote wake request initiated by a user of a remote communication device, power on at least portions of the avionics in response to the received remote wake request by causing the first power supply to be coupled to the at least portions of the avionics, receive aircraft parameter information from the powered on portions of the avionics, and provide the received aircraft parameter information to the
(Continued)

transceiver for transmission from the aircraft, optionally to the user of the remote communication device.

9 Claims, 8 Drawing Sheets

Related U.S. Application Data continuation of application No. 16/861,020, filed on Apr. 28, 2020, now Pat. No. 11,275,369.

(58) Field of Classification Search
CPC . H04L 2012/4028; H04L 12/12; G01C 23/00; G07C 5/00
USPC .......................................................... 701/3
See application file for complete search history.

(56) References Cited

U.S. PATENT DOCUMENTS

| | | | |
|---|---|---|---|
| 6,876,905 | B2 | 4/2005 | Farley et al. |
| 7,187,927 | B1 | 3/2007 | Mitchell |
| 7,436,322 | B2 | 10/2008 | Crank |
| 8,391,788 | B1* | 3/2013 | Mazuk ................. H04B 1/7163 |
| | | | 455/41.2 |
| 8,493,906 | B1 | 7/2013 | Troxel et al. |
| 9,191,053 | B2 | 11/2015 | Ziarno et al. |
| 9,202,318 | B2 | 12/2015 | Batcheller et al. |
| 9,327,600 | B1* | 5/2016 | Nehmeh ................. B64D 41/00 |
| 10,084,529 | B1 | 9/2018 | Riechers et al. |
| 10,362,035 | B1 | 7/2019 | Corbett |
| 11,659,490 | B2 | 5/2023 | Dondoneau et al. |
| 11,762,383 | B2 | 9/2023 | Murch et al. |
| 2006/0030311 | A1 | 2/2006 | Cruz et al. |
| 2006/0040660 | A1 | 2/2006 | Cruz et al. |
| 2006/0217851 | A1 | 9/2006 | McGuffin et al. |
| 2007/0179689 | A1 | 8/2007 | Soulie et al. |
| 2007/0228214 | A1 | 10/2007 | Horak |
| 2007/0246610 | A1 | 10/2007 | Rath et al. |
| 2008/0119968 | A1 | 5/2008 | Loda |
| 2010/0256841 | A1 | 10/2010 | Garrec et al. |
| 2010/0273450 | A1 | 10/2010 | Papineau et al. |
| 2011/0313614 | A1 | 12/2011 | Hinnant, Jr. et al. |
| 2012/0029853 | A1 | 2/2012 | Baumheinrich et al. |
| 2015/0177737 | A1* | 6/2015 | Jensen ................. G05D 1/0866 |
| | | | 701/3 |
| 2015/0234387 | A1 | 8/2015 | Mullan et al. |
| 2016/0119052 | A1 | 4/2016 | Frerking et al. |
| 2016/0205724 | A1* | 7/2016 | Shi ........................ H04W 92/02 |
| | | | 370/254 |
| 2017/0043249 | A1 | 2/2017 | Bartlett et al. |
| 2017/0045884 | A1 | 2/2017 | Kablaoui |
| 2018/0170575 | A1* | 6/2018 | Ziarno ................... G07C 5/085 |
| 2018/0205658 | A1 | 7/2018 | Sullivan |
| 2018/0352512 | A1 | 12/2018 | Kim et al. |
| 2020/0028687 | A1* | 1/2020 | Castet ................... H04L 9/3231 |
| 2020/0044692 | A1 | 2/2020 | Sheffield |
| 2021/0160755 | A1 | 5/2021 | Dondoneau et al. |
| 2021/0160781 | A1 | 5/2021 | Dondoneau et al. |
| 2021/0333792 | A1 | 10/2021 | Murch et al. |
| 2022/0404824 | A1 | 12/2022 | Murch et al. |
| 2023/0254772 | A1 | 8/2023 | Dondoneau et al. |

FOREIGN PATENT DOCUMENTS

| | | |
|---|---|---|
| WO | 2021/108571 A1 | 6/2021 |
| WO | 2021/108577 A1 | 6/2021 |

OTHER PUBLICATIONS

Appareo Gateways Overview, "Rugged Edge Computers For Mobile Equipment", Product Overview Sheet, www.appareo.com, 2 pp.
Appareo iot Gateway 270/370 Data Sheet, "Advanced Communication Edge Computer Model 608065-0000XX", Product Data Sheet, www.appareo.com/iot, (2019) 5 pp.
Appareo iot Gateway 300 Data Sheet, "Advanced communication computing platform for mobile equipment applications", Product Data Sheet, www.appareo.com, (2016-2017) 6 pp.
Avionica avRDC Remote Data Concentrator, Product Description Sheet, https://avionica.com/avrdc, 5 pp.
Bad Elf, "Bad Elf Wombat", Product Description Page, https://bad-elf.com/pages/wombat-piston, (2020) 7 pp.
European Search Report for EP Patent Application No. 21796772.8, Issued on Apr. 12, 2024, 10 pages.
Garmin, GDU 104X Installation Manual, Garmin Ltd., Jul. 2010, 70 pp.
International Preliminary Report on Patentability received for PCT Patent Application No. PCT/US20/62254, mailed on Jun. 9, 2022, 8 pages.
International Preliminary Report on Patentability received for PCT Patent Application No. PCT/US20/62260, mailed on Jun. 9, 2022, 12 pages.
International Search Report and Written Opinion received for PCT Patent Application No. PCT/US20/62254, mailed on Feb. 9, 2021, 8 pages.
International Search Report and Written Opinion received for PCT Patent Application No. PCT/US20/62260, mailed on Feb. 12, 2021, 12 pages.
International Search Report and Written Opinion received for PCT Patent Application No. PCT/US2020/062254, mailed on Feb. 9, 2021, 8 pages.
International Search Report and Written Opinion received for PCT Patent Application No. PCT/US2021/029309, mailed on Aug. 5, 2021, 12 pages.
Jelinskis et al., "Mobile Application Based Traffic Advisory System for General Aviation—Is It Possible?", 2015 Advances in Wireless and Optical Communications (RTUWO), 2015, 4 pages.
Pratt & Whitney, Digital Engine Services, "Fast(Trademark) Solution" Products and Service Sheet, https://www.pwc.ca/en/products-and-services/services/digital-engine-services/fast-solution, 5 pp.
Pratt & Whitney, Digital Engine Services, "Fast™ Solution" Products and Service Sheet, https://www.pwc.ca/en/products-and-services/services/digital-engine-services/fast-solution, 5 pp.

* cited by examiner

Awake-In Air Mode Operation

- Switched Power Supply and Distribution System powered ON
- Relay controlled to power OFF Remote Wake Bus
- Transceiver powered OFF
- Gateway Module collects and stores flight data
- Gateway Module not responsive to remote data update requests

FIG. 6

Awake-On Ground Mode Operation

- Switched Power Supply and Distribution System powered ON
- Relay controlled to power OFF Remote Wake Bus
- Transceiver powered ON
- Gateway Module collects and stores flight data
- Flight data from Gateway Module is transmitted
- Gateway Module is responsive to remote data update requests

Deep Sleep Mode Operation

- Switched Power Supply and Distribution System powered OFF
- Transceiver OFF
- Gateway Module not responsive to remote data update requests

FIG. 9

MOBILE DEVICE APPLICATION-BASED
AIRCRAFT DATA STORAGE AND
COMMUNICATION SYSTEM

CROSS-REFERENCE TO RELATED
APPLICATION

This application is a Continuation of U.S. application Ser. No. 17/590,598, filed Feb. 1, 2022, now U.S. Pat. No. 11,762,383, that is a Continuation of U.S. application Ser. No. 16/861,020, filed Apr. 28, 2020, now U.S. Pat. No. 11,275,369, which is herein incorporated by reference in its entirety.

FIELD

This disclosure relates generally to aircraft data collection, storage and communication systems. Disclosed embodiments include a mobile device with an application that allows a user to remotely receive current aircraft parameter information.

BACKGROUND

Aircraft collect a wide range of data and information during operation. The collected information can be stored on the aircraft and/or transmitted to data management systems for storage. Flight, engine and other data can, for example, be stored in a data module on the aircraft during operation and transmitted to the data management system upon landing (e.g., via a cellular or Wi-Fi communication networks). Users can access the information through the data management system.

There remains, however, a need for improved aircraft data collection, storage and communication systems. A system capable of providing remote users with information representative of current status of aircraft systems would be especially desirable.

SUMMARY

Disclosed embodiments include an aircraft coupled to a user's communication device by a communication network. Through use of the communication device, the user, such as a pilot, can obtain updated aircraft status information at locations remote from the aircraft.

Embodiments include an aircraft comprising a first power supply, avionics including a plurality of sensors, wherein the plurality of sensors provide aircraft parameter information, a transceiver and a gateway. The gateway includes a processing system, is coupled to the first power supply, avionics and transceiver, and is configured to operate in a first mode. During operation in the first mode the gateway receives from the transceiver a remote wake request initiated by a user of a remote communication device, powers on at least portions of the avionics in response to the received remote wake request by causing the first power supply to be coupled to the at least portions of the avionics, receives aircraft parameter information from the powered on portions of the avionics, and provides the received aircraft parameter information to the transceiver for transmission from the aircraft, optionally to the user of the remote communication device.

In embodiments, the gateway may be configured to power off the at least portions of the avionics after receiving the aircraft parameter information during operation in the first mode. In embodiments the gateway powers on portions, but not all, of the avionics in response to the received remote wake request. The powered-on portions of the avionics may include, for example, sensors that provide aircraft information including one or more of fuel level, oxygen level, anti-icing fluid level, oil temperature, battery level, tire pressure, oil level or door lock state.

In embodiments, the aircraft further comprises a relay coupling the first power supply to the at least portions of the avionics. The gateway may be coupled to the relay and is configured to power on the at least portions of the avionics by actuating the relay. The gateway may be configured to power off the at least portions of the avionics after receiving the aircraft parameter information by actuating the relay.

In embodiments, the first power supply includes, and optionally substantially consists of, one or more batteries, and wherein the one or more batteries are directly coupled to the gateway.

Embodiments of the aircraft further comprise a switched power distribution system configured to power on and power off in response to user control. The at least portions of the avionics that are powered on in response to the remote wake request may include a first supply input configured to be coupled to the first power supply by the gateway in response to the remote wake request, and a second supply input coupled to the switched power distribution system.

The switched power distribution system may comprise one or more switched power supply buses, wherein each second supply input of the at least portions of the avionics that are powered on in response to the remote wake request is coupled to at least one of the one or more switched power supply buses, and a battery switch coupling the one or more switched power supply buses to a battery to power on and power off the switched power distribution system in response to the user control.

The gateway may be configured to operate in a plurality of modes including the first mode and a second mode. In such embodiments, the gateway may transition from the first mode to the second mode when the switched power distribution system is powered on and may transition from the second mode to the first mode when the switched power distribution system is powered off. The gateway may be configured to operate in the second mode to receive from the transceiver a remote wake request initiated by a user of a remote communication device, not cause the first power supply to be coupled to the at least portions of the avionics, receive aircraft parameter information from the powered-on portions of the avionics, and provide the received aircraft parameter information to the transceiver for transmission from the aircraft. In embodiments, the gateway logs flight data from the avionics when the gateway is in the second mode.

The gateway may be further configured to operate in a third mode, wherein the gateway transitions from the first mode to the third mode when a low first power supply condition is identified, and transitions from the third mode to the second mode when the switched power distribution system is powered on. The gateway may be configured to operate in the third mode to not power up the at least portions of the avionics, and not receive aircraft parameter information from the powered-up portions of the avionics.

In embodiments, the remote wake request is received by the transceiver from a data management system over a second transmission link in response to the initiation of the request from the user's remote communication device to the data management system over a first transmission link. In other embodiments, the remote wake request is received by the transceiver from the user's remote communication device via a transmission link (e.g., not through the data management system).

Embodiments also include a gateway for use in an aircraft to provide aircraft parameter information updates during operation in a first mode. The gateway may comprise a parameter information port configured to receive aircraft parameter information from systems on the aircraft, a power control output port, a transceiver port, and a processing system coupled to the parameter information port, the power control output port and the transceiver port. The processing system may be configured to operate to receive at the transceiver port a remote wake request initiated by a user of a remote communication device, provide power on control signals to the power control output port in response to the received remote wake request, wherein the power on control signals are configured to cause at least portions of the systems on the aircraft to power on in response to the received remote wake request by causing a first power supply to be coupled to the at least portions of the systems on the aircraft through a first power supply bus, receive at the parameter information port aircraft parameter information from the powered on portions of the systems of the aircraft, and provide the received aircraft parameter information to the transceiver port for transmission from the aircraft, optionally to the user of the remote communication device.

The processing system is further configured to provide power off control signals to the power control output port after providing the received aircraft parameter information to the transceiver port in embodiments, The power off control signals may be configured to cause the at least portions of the systems of the aircraft to power off by causing the first power supply to be decoupled from the at least portions of the systems of the aircraft through the first power supply bus.

In embodiments, the gateway further comprises a first power supply input configured to be directly coupled to a battery of the aircraft through the first power supply bus, and a second power supply input configured to be coupled to a switched power supply and distribution system of the aircraft. The processing system may be configured to provide power on control signals causing the battery to be coupled to the avionics through the first power supply bus during operation of the gateway in the first mode.

Embodiments further include a relay. The relay may comprise a supply input configured to be coupled to the first power supply through the first power supply bus, a control input coupled to the power control output port of the gateway, and a supply output configured to be coupled to the systems of the aircraft.

The systems of the aircraft comprise sensors in embodiments. The systems of the aircraft comprise avionics in embodiments.

Embodiments also include a method for operating an aircraft in a first mode to provide updated aircraft parameter information to a remote user. The method comprises receiving at the aircraft an information update request initiated by a user of a remote communication device, powering on at least portions of the aircraft, optionally including at least portions of avionics or other systems of the aircraft, in response to the received information update request, receiving aircraft parameter information from the powered on at least portions of the aircraft, and transmitting the received aircraft parameter information from the aircraft, optionally to the user of the remote communication device. The method may further comprise powering off the at least portions of the aircraft after receiving the aircraft parameter information. In embodiments, powering on the at least portions of the aircraft in the first mode comprises causing the at least portions of the aircraft to be coupled to a battery through a first bus.

Embodiments of the method may include operating the aircraft in a second mode, comprising causing the at least portions of the aircraft to be coupled to a switched power supply and distribution system through a second bus. Causing the at least portions of the aircraft to be coupled to the switched power supply and distribution system in the second mode comprises causing portions of the aircraft in addition to the at least portions to be coupled to the switched power supply and distribution system in embodiments. Powering on the at least portions of the aircraft in the first mode includes powering on portions, but not all, of the aircraft.

DETAILED DESCRIPTION

Figure 1:
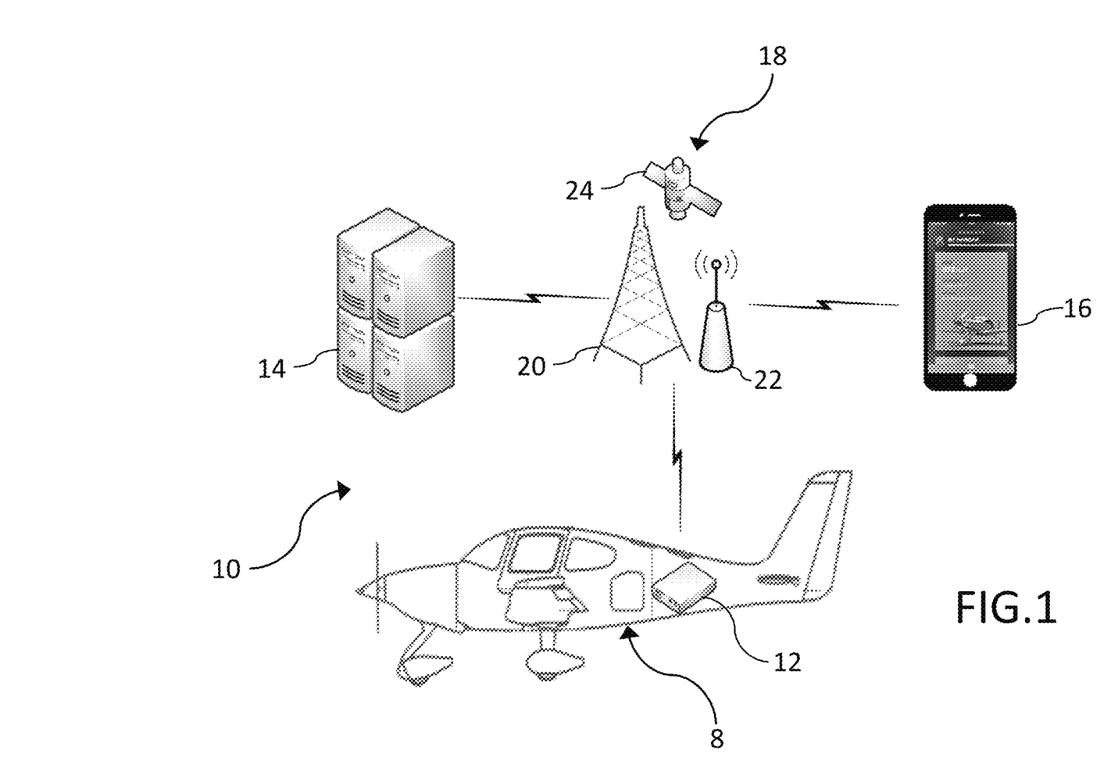
FIG. 1 is a diagrammatic illustration of an aircraft and a data storage and communication system in accordance with embodiments.

FIG. 1 is a diagrammatic illustration of an aircraft 8 and a data storage and communication system 10 in accordance with embodiments. System 10 includes a gateway module 12 on the aircraft 8. The gateway module 12 communicates with a data management system 14 and a user's communication device 16 via transmission links provided by one or more communication networks 18. Illustrated examples of communication networks 18 include cellular network 20, Wi-Fi network 22 and satellite network 24. Communication networks 18 may also include other private and public, wireless and wired networks such as the Internet. As described in greater detail below, a user such as a pilot, owner or service provider of the aircraft 8 can use the communication device 16 to obtain current information regarding the status of the aircraft. For example, the user may use the system 10 to determine whether requested refueling has been completed before departing from home or a meeting to the airport where the aircraft is located. In embodiments, the operator initiates the information request, sometimes referred to herein as a remote wake request or an information update request, using an application-based graphical user interface (GUI) on the mobile device 16. In embodiments, the mobile device 16 transmits the information update request to the data management system 14 via the communication networks 18. Data management system 14 is responsive to the request from the communication device 16, and transmits an information request or command to the aircraft 8 via the communication network 18. The gateway 12 receives the information update request, collects the aircraft parameter and/or other status information from the avionics and/or other systems of the aircraft 8, and transmits the updated parameter information to the data management system 14 via the communication network 18. The data management system 14 transmits the information to the user's communication device 16 via the communication network 18, where it is displayed to the user, for example on the GUI.

Communication device 16 may be a smartphone, tablet, smart watch, laptop computer or other mobile device. Alternatively, or in addition, the communication device 16 may be a desktop computer. In yet other embodiments the communication device 16 includes one or more other known or otherwise conventional devices operable by the user to transmit a remote wake request and/or to display or otherwise provide the received aircraft parameter information to the user as described herein. An advantage of the system 10 is that the pilot or other user can use the device 16 at a location remote from the aircraft 8 to request and receive then-current information on the status of the aircraft. A mobile phone is shown as the communication device 16 in FIG. 1 for purposes of example. In embodiments described below, the communication device 16 includes an application (i.e., an app) that can be operated by the user in connection with the information update request and the display of the information received in response to the request. Other embodiments use other user interface and communication approaches, for example a browser accessible website, email or text messages, for communicating information update requests and receiving updated information for display.

Data management system 14 provides data storage and communication functions, and can be embodied by any known or otherwise conventional data storage, processing and communication components. By the communication functionality, data management system 14 (1) receives the requests for updated aircraft parameter or other status information from the communication device 16, (2) transmits requests for updated status information to the gateway module 12 (e.g., in the form of commands responsive to the requests from the communication device), (3) receives updated aircraft status information from the gateway module 12 in response to information requests, and (4) transmits the updated status information to the communication device. In embodiments, the data management system 14 also receives from the aircraft 8 information in addition to the information responsive to the requests. In connection with embodiments of the communication device 16 described above, for example, the communication functionality of the data management system 14 can be configured to receive and provide information for app-based, web-based, email and/or text message user interface and communication approaches. In connection with these actions the data management system 14 can provide additional functionality. For example, the data management system 14 may authenticate the information requests from the communication device 16 and/or provide other security functions and reformat the requests into formats suitable for receipt and/or action by the gateway module 12. In embodiments, the data management system 14 may select an appropriate communication network 18.

By the data storage functionality, data management system 14 stores the data or other information received from aircraft 8 in response to the information update requests. The data management system 14 may also store other information received from the aircraft 8. Embodiments of data management system 14 may include analytics processing functionality to process the stored data from aircraft 8. The data management system 14 may be owned and operated by a manufacturer or service provider of the aircraft 8. In other embodiments the data management system 14 is operated by one or more third parties on behalf of the manufacturer or service provider of the aircraft 8 (e.g., a cloud-based system).

Figure 2:
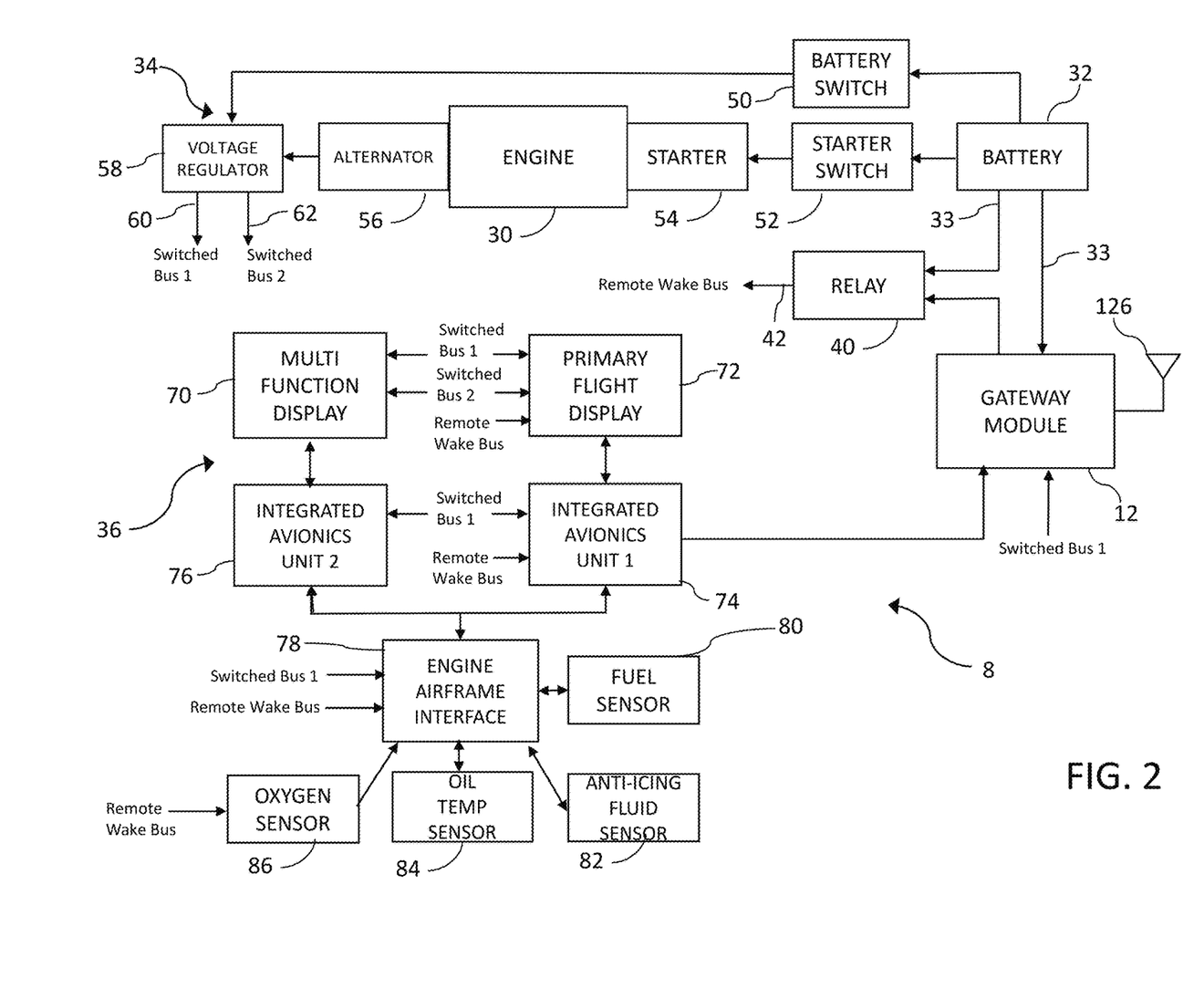
FIG. 2 is a diagrammatic illustration of certain components of the aircraft that are coupled to the data storage and communication system.

FIG. 2 is a diagrammatic illustration of components of the aircraft 8 coupled to the gateway module 12 in accordance with embodiments. The illustrated embodiments include engine 30, first power supply such as battery 32, second or switched power supply and distribution system 34, avionics 36 and relay 40. Although shown as a single battery 32 in FIG. 2, the first power supply includes more than one battery in embodiments. In embodiments, the electrical energy source of the first power supply substantially comprises the battery 32. As shown, the battery 32 is coupled to the gateway module 12 and the relay 40 by a power distribution system including a bus 33. In embodiments, the battery 32 is directly coupled to the gateway module 12 and the relay 40 by the bus 33 (i.e., the connections between the battery and the gateway module and relay are not switched). The bus 33 of the power distribution system between the battery 32 and the gateway module 12 and relay 40 may be a "hot" or "convenience" bus that supplies power to relatively few other components on the aircraft 8 (e.g., door locks and convenience lighting (not shown)).

As described in greater detail below, gateway module 12 is configured to control the relay 40 and cause the relay to controllably apply power from the battery 32 to bus 42, identified as a remote wake bus in FIG. 2, that distributes power from the battery to certain components of the aircraft 8. Remote wake bus 42 is effectively a switched power distribution bus controlled by the gateway module 12 (e.g., the relay, in response to control signals from the gateway module, powers on and powers off the remote wake bus 42). In particular, and as described in greater detail below, gateway module 12 causes power to be applied to the remote wake bus 42 when the gateway module is operated in a first or remote wake mode.

Switched power supply and distribution system 34 can be configured in a conventional or otherwise known manner, and in the illustrated embodiments includes battery switch 50, starter switch 52, starter 54, alternator 56, voltage regulator 58 and one or more buses such as 60 and 62 (identified as switched bus 1 and switched bus 2, respectively, in FIG. 2). Battery 32 is coupled to the voltage regulator 58 by battery switch 50, and to the starter 54 by starter switch 52. When the switched power supply and distribution system 34 is powered on by a user's actuation of the battery switch 50, electrical power is provided to the one or more switched buses such as 60 and 62 by the voltage regular 58. Although two switched buses 60 and 62 are shown for purposes of example, other embodiments include switched power supply and distribution systems such as 34 that include more than two buses. Each of such a plurality of buses can be configured to distribute switched electrical power to one or more and/or different components of the aircraft 8, and/or may have different operating characteristics such as different current capacities. As described in greater detail below, for example, in embodiments the buses 60 and 62 distribute switched power to one or more and different components of the avionics 36. Embodiments of aircraft 8 (not shown) may include, for example, two power distribution buses referred to as "main bus 1" and "main bus 2," and two buses referred to as "essential bus 1" and "essential bus 2".

As shown in FIG. 2, starter 54 is coupled to the engine 30, and to the battery 32 by starter switch 52. Alternator 56 is coupled to the engine 30 and to voltage regulator 58. In response to a user's actuation of the starter switch 52, starter 54 can start the engine 30. When the engine 56 is on or running, alternator 56 produces electrical power which is applied to voltage regulator 58 and distributed to the components of aircraft 8 by the switched buses such as 60 and 62. Although the switched power supply and distribution system 34 shown and described in connection with FIG. 1 has one starter switch 52, starter 54, alternator 56 and voltage regulator 58, other embodiments include multiple components of these types configured in conventional or otherwise known manners, and/or may be coupled to one or more batteries different than the battery 32 coupled to the battery switch 50.

Avionics 36 comprises several interconnected subsystem components including multifunction display 70, primary flight display 72, first integrated avionics unit 74, second integrated avionics unit 76 and engine airframe interface 78. In embodiments, the multifunction display 70, primary flight display 72, first integrated avionics unit 74, second integrated avionics unit 76 and engine airframe interface 78 are configured as line replaceable units (LRUs). Avionics 36 of these types are commercially available from entities such as Garmin Ltd. Other embodiments of avionics 36 include additional and/or alternative components, for example an engine control unit. In embodiments the gateway module 12 may be connected to additional and/or alternative components in the aircraft 8 to provide the updated aircraft parameter information functionality described herein, for example to an engine control unit. In the illustrated embodiments the first integrated avionics unit 74, second integrated avionics unit 76 and engine airframe interface 78 are coupled to one another by one or more data busses. Multifunction display 70 is coupled to the integrated avionics unit 76 by one or more data busses. Primary flight display 72 is coupled to the integrated avionics unit 74 by one or more data busses.

Avionics 36 also includes a plurality of sensors. The embodiments illustrated in FIG. 2, for example, includes fuel level sensors 80, anti-icing fluid level sensors 82, oil temperature sensor 84 and oxygen bottle pressure sensor 86, all of which are shown coupled to the engine airframe interface 78. Other embodiments (not shown) include additional and/or different sensors, and/or such sensors can be coupled to different components of the avionics 36 and/or to the gateway module 12. For example, embodiments may include one or more of a tire pressure sensor, oil level sensor, and door lock state sensor. As described below, embodiments of aircraft 8 also include a battery voltage sensor, which may be incorporated into the gateway module 12. Other embodiments of aircraft 8 include yet additional sensors such as for example global positioning system (GPS) and an inertial navigation system sensors.

Sensors such as 80, 82, 84 and 86 provide parameter data or information on characteristics of the aircraft 8. Fuel level sensor 80, for example, provides information on the amount of fuel in the fuel tanks of the aircraft (not shown), and may include more than one such sensor (e.g., each fuel tank may include one or more associated sensors). Anti-icing fluid level sensor 82 provides information on the amount of fluid in the reservoir of an ice protection system on the aircraft 8 (e.g., TKS fluid for use in connection with TKS ice protection systems (not shown)), and may include one or more such sensors (e.g., each of one or more reservoirs may include one or more associated sensors). Oil temperature sensor 84 provides information on the temperature of the engine oil, and therefore the temperature of engine 30, that can be used to determine whether the engine needs to be preheated prior to operation. Oxygen bottle pressure sensor 86 provides information on the amount of oxygen in the tanks of an oxygen system on the aircraft 8, and may include one or more such sensors.

As shown in FIG. 2, components of the avionics 36 and the gateway module 12 are coupled to one or more of the switched buses such as 60 and 62, and/or to the remote wake bus 42, and/or to no power distribution bus, depending on factors such as their functions and configurations of the components. For example, components of the avionics 36 that require electrical power (i.e., need to be powered on) to provide then-current aircraft parameter information to the gateway module 12 during operation of the gateway module in the remote wake mode may be coupled to the remote wake bus 42 in embodiments. Components of the avionics 36 that do not require electrical power to provide aircraft parameter information during operation of the gateway module 12 in the remote wake mode need not be coupled to the remote wake bus 42 in embodiments. In the embodiments illustrated on FIG. 2, some but not all of the components of the avionics 36, including some but not all of the sensor components, are coupled to the remote bus 42. Primary flight display 72, integrated avionics unit 74, engine airframe interface 78 and oxygen bottle pressure sensor 86 are coupled to the remote wake bus 42 in the illustrated embodiments for purposes of example. Primary flight display 72 and multifunction display 70 are connected to both switched buses 60 and 62, whereas integrated avionics units 74 and 76, engine airframe interface 78 and gateway module 12 are connected to switched by 60 but not switched bus 62 in the illustrated embodiments. Oil temperature sensor 84, fuel level sensor 80 and anti-icing fluid sensor 82 are not connected to any of the remote wake bus 42 or the switched buses 60, 62. Sensors such as oil temperature sensor 84, fuel level sensor 80 and anti-icing fluid sensor 82, for example, may not require power to provide the monitored information to avionics 36 and/or may receive power from other components of the avionics to which they are coupled. In the illustrated embodiments, for example, fuel level sensor 80 may receive power from engine airframe interface 78.

Gateway module 12 is coupled to the avionics 36 (e.g., to integrated avionics unit 74 in the illustrated embodiment) by a data bus, which is configured as an ARINC 429 bus in embodiments. As described in greater detail below, gateway module 12 may function as a flight data recorder, and store an extensive set of flight information received from avionics 36, including the parameter information received from the sensor components, during certain operating modes of gateway module 12. During certain operating modes, the gateway module 12 causes that flight data to be transmitted from the aircraft 8. During the remote wake operating mode, the gateway module 12 receives certain aircraft parameter information from the avionics 36, and transmits that information and optionally other information such as that representative of information monitored by the gateway module itself, from the aircraft. As described in greater detail below, in embodiments, during operation in the remote wake mode the gateway module 12 transmits a subset of the flight data that can be collected and stored by the gateway module 12.

In embodiments, the gateway module 12 is alternatively or additionally coupled to receive aircraft parameter information from other systems on the aircraft 8, for example other control or interface systems, and/or from one or more sensors that are not part of the avionics 36 of the aircraft. In embodiments of these types, the gateway module 12 is configured to receive updated aircraft parameter information from such systems and/or sensors by approaches that are substantially the same as or similar to those described herein, but through communication paths that do not include avionics 36. For example, in these embodiments the sensors can be coupled to the remote wake bus 42 and/or directly to the gateway module 12.

Figure 3:
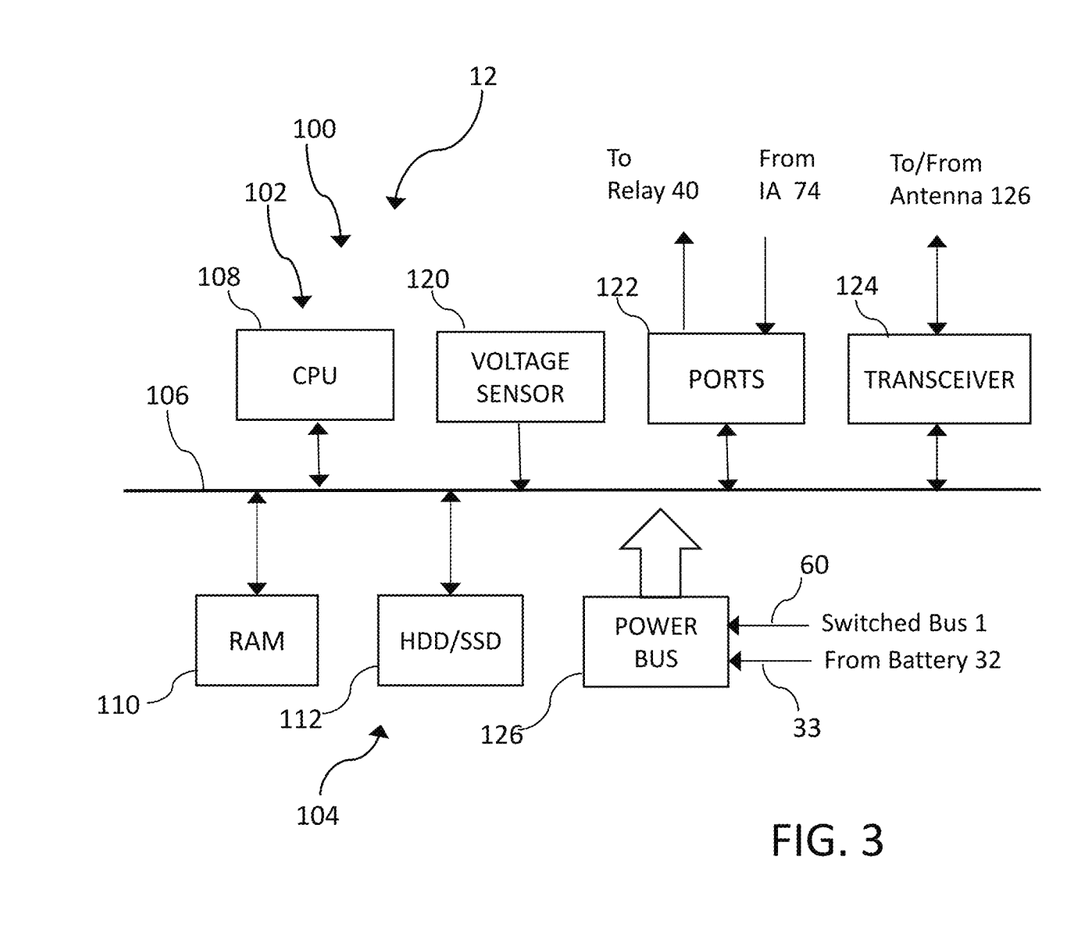
FIG. 3 is a diagrammatic illustration of the gateway module in accordance with embodiments.

FIG. 3 is a diagrammatic illustration of the gateway module 12 in accordance with embodiments. As shown, the gateway module 12 includes a processing system 100 comprising processing components 102 and storage components 104 coupled by a bus 106. Processing components 102 may, for example, include one or more central processing units (CPU) 108, and provide the processing functionality of the gateway module 12. The storage components 104 may include RAM memory 110 and hard disk drive (HDD) and/or solid state drive (SSD) memory 112, and provide the storage functionality of the gateway module 12. For example, operating system and other software used by the processing components 102 to implement the operating modes of the gateway module 12 described herein may be stored in the storage components 104. Components of the processing system 100 can be implemented as programmed microprocessors, application specific integrated circuits (ASICs) and/or discrete circuit components. Other embodiments of the processing system 100 are implemented using other conventional or otherwise known systems or devices.

The illustrated embodiments of the gateway 12 include voltage sensor 120, input output (I/O) ports 122 and transceiver 124, all of which are shown coupled to the processing system 100 via the bus 106. The gateway module 12 also includes a power bus 126 that distributes power from one or more power sources within the aircraft 8 to the components of the gateway 12. In the illustrated embodiments for example, the processing system 100 is coupled to the switched power supply and distribution system 34, such as via the switched bus 60, and/or the battery 32 via the bus 33. By the connection to the switched power supply and distribution system 34, the gateway module 12 is able to monitor when the switched power supply and distribution system is switch on. Voltage sensor 120, which is coupled to the bus 33 and provides information on the voltage level or charge state of the battery 32, is an example of a sensor not coupled to the avionics 36 that is configured to provide updated aircraft parameter information to the gateway 12. I/O ports 122 include one or more ports for coupling control signals between the processing system 100 and the relay 40, and between the processing system and the avionics 36 (e.g., via the ARINC bus and integrated avionics unit 74 in the illustrated embodiments). The functional components of the gateway module 12 described in connection with FIG. 3 may be incorporated into one or more physical housings or other structures (not shown).

Transceiver 124 is coupled to an antenna 126 (shown in FIG. 2), and receives data communications from and transmits data to remote locations via the communication networks 18. Transceiver 124 can be configured for data communications via one or more of the communication networks 18 described in connection with FIG. 1. In embodiments, for example, transceiver 124 includes one or more of a cellular transceiver for communications over cellular network 20, a Wi-Fi transceiver for communications over Wi-Fi network 22, or a satellite transceiver for communications over satellite network 24 (not separately shown). In other embodiments, one or more, or all, components of transceiver 124 are separate from the housings or other physical structures in which the other functional components of the gateway module 12 are mounted, and coupled to the gateway module by one or more communication buses or other communication links (not shown).

Figure 4:
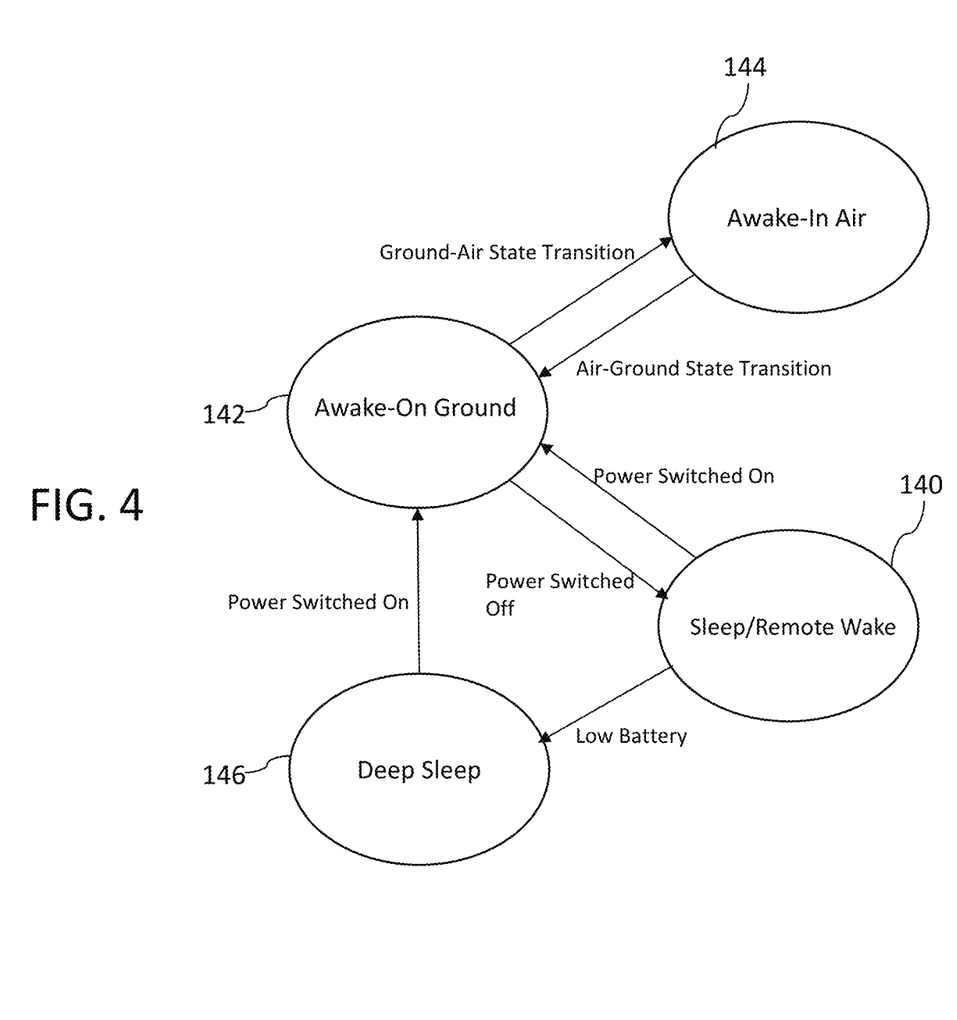
FIG. 4 is a state diagram illustrating operating modes of the gateway module.

FIG. 4 is a state diagram illustrating the operational modes of the gateway 12 in connection with the associated components of aircraft 8. In the illustrated embodiments the gateway 12 operates in a first, sleep or remote wake mode 140, a second or awake-on ground mode 142, a third or awake-in air mode 144 and a fourth or deep sleep mode 146. As shown, the gateway module 12 transitions from the remote wake mode 140 to the awake-on ground mode 142 when the switched power supply and distribution system 34 is powered on (e.g., when a user actuates battery switch 50 to supply switched power to aircraft 8 through buses 60 and 62 in the embodiments described in connection with FIG. 2). Gateway module 12 transitions from the awake on-ground mode 142 to the remote wake mode 140 when the switched power supply and distribution system 34 is powered off. From the awake-on ground mode 142, the gateway module 142 will transition to the awake-in air mode 144 when the aircraft 8 changes from a ground state (e.g., when the aircraft is on the ground) to an airborne state (e.g., when the aircraft is in flight). From the awake-in air mode 144 the gateway module 12 transitions to the awake-on ground mode 142 when the aircraft 8 changes from the airborne state to the ground state. Transitions between the ground and airborne states can be detected, for example, by force sensors on a wheel of the aircraft 8 (not shown) that are coupled to the avionics 36 or by indirect approaches based on sensor data collected in the avionics. When gateway module 12 identifies a low battery charge state, it transitions from the remote wake mode 140 to the deep sleep mode 146. From the deep sleep mode 146, the gateway module 12 transitions to the awake-on ground mode 142 when the switched power supply and distribution system 34 is powered on.

Figure 5:
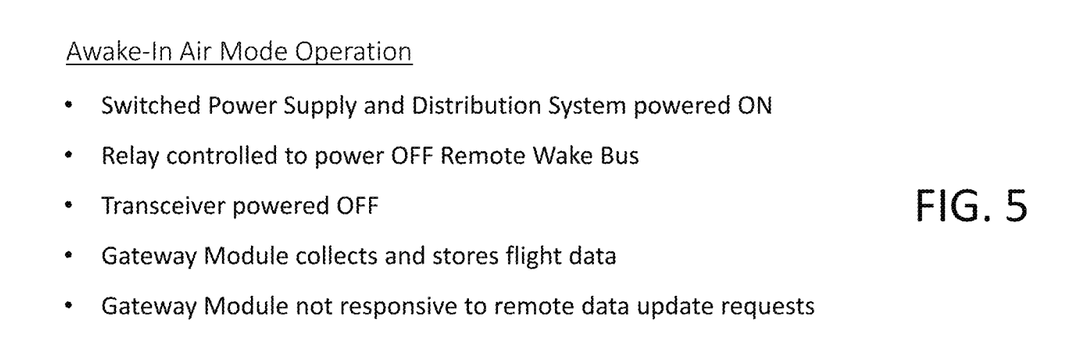
FIG. 5 describes certain operations of the gateway module in the awake-in air mode.

FIG. 5 is a diagrammatic illustration of the operation of gateway module 12 in connection with other components of the aircraft 8 during the awake-in air mode 144 in accordance with embodiments. As shown, while the aircraft 8 is in flight (i.e., in the air state), the switched power supply and distribution system 34 will typically be on and providing power to the avionics 36 and other electrically-powered components of the aircraft. In embodiments, gateway module 12 operates to control or switch the relay 40 to power off the remote wake bus 42. In embodiments, gateway module 12 collects and stores an extensive set of flight data while the aircraft 8 is in flight. The flight data collected and stored while the aircraft 8 is in flight includes data in addition to the parameter information that is provided during operation in the remote wake mode 140. Such additional flight data may include data collected by known or otherwise conventional flight data recorders such as aircraft speed, direction and altitude. In embodiments, at least portions of such additional flight data may be collected from portions of the avionics 36 that are powered by the switched power supply and distribution system 34, but not by the remote wake bus 42 (e.g., from multifunction display 70 and/or integrated avionics 76 in the embodiments illustrated in FIG. 2). In embodiments, the transceiver 124 is powered off during awake-in air mode 144. In embodiments, the remote wake module 12 may be responsive to remote wake requests that might be initiated by the user through communication device 16 or transmitted by the data management system 14 while the remote wake module is in the awake-in air mode (e.g. in embodiments configured for use with satellite networks 24 shown in FIG. 1). In other embodiments, remote wake module 12 is not responsive to remote wake requests that might be initiated by the user through communication device 16 or transmitted by the data management system 14 while the remote wake module is in the awake-in air mode. Accordingly, the remote wake module 12 does not perform remote wake requests during operation in the awake-in air mode 144 in some embodiments.

Figure 6:
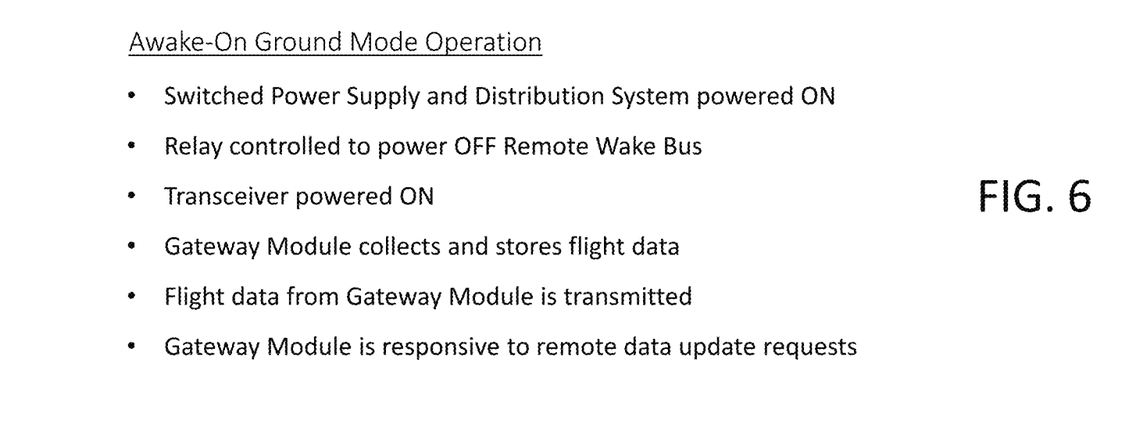
FIG. 6 describes certain operations of the gateway module in the awake-on ground mode.

FIG. 6 is a diagrammatic illustration of the operation of gateway module 12 in connection with other components of the aircraft 8 during the awake-on ground mode 142 in accordance with embodiments. As shown, while the aircraft 8 is on the ground (i.e., in the ground state) and the gateway module 12 is operating in the awake-on ground mode 142, the switched power supply and distribution system 34 will typically be on and providing power to the avionics 36 and other electrically-powered components of the aircraft. In embodiments, gateway module 12 operates to control or switch the relay 40 to power off the remote wake bus 42 while the gateway module 12 is operating in the awake-on ground mode 142. In other embodiments the gateway module 12 causes the relay 40 to power on the remote wake bus 42 while the gateway module 12 is operating in the awake-on ground mode 142. In the illustrated embodiments, the gateway module 12 collects and stores the flight data while the aircraft 8 is operating in the awake-on ground mode 142. In embodiments, and as described in greater detail below, gateway module 12 is operable to be responsive to information update requests when operating in the awake-on ground mode 142. Alternatively, in other embodiments the gateway module 12 is configured to be not responsive to information update requests when operating in the awake-on ground mode 142.

Data stored by the gateway module 12 is transmitted from the aircraft 8 (e.g., to the data management system 14) via communication networks 18 during the awake-on ground mode 142. In embodiments, the transceiver 124 is powered on during the awake-on ground mode 142, and the flight data can be transmitted by the transceiver 124. Gateway module 12 may be configured to cause the transmission of the flight data by the transceiver 124 in these embodiments. In embodiments, transmission of the flight data from the gateway module 12 is automatically initiated when the aircraft 8 transitions from the awake-in air mode 144 to the awake-on ground mode 142.

As described above in connection with FIG. 4, the aircraft 8 can be powered off by the user following the landing and during operation of the gateway module 12 in the awake-on ground mode 142. For example, the pilot may actuate the battery switch 50 to power off the switched power supply and distribution system 34, and thereby switch off the power supplied to avionics 36 by the switched power supply and distribution system. In embodiments, operation of the gateway module 12 transitions to the remote wake mode 140 when the aircraft 8 is powered off.

Figure 7:
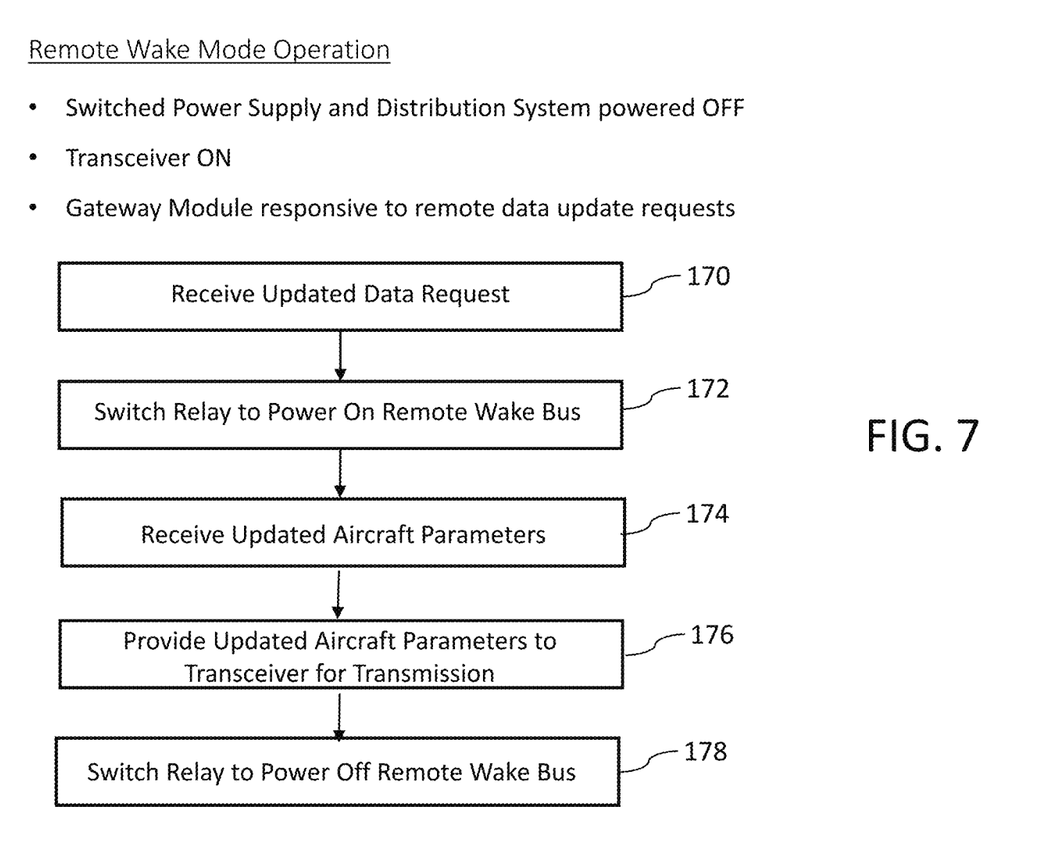
FIG. 7 describes certain operations of the gateway module in the sleep/remote wake mode.

FIG. 7 is a diagrammatic illustration of the operation of gateway module 12 during the remote wake mode 140. As described above, during operation in the remote wake mode 140, the aircraft 8 will typically be on the ground (i.e., in the ground state), and the switched power supply and distribution system 34 is switched off to power off the aircraft. Because the switched power supply and distribution system 34 is powered off, portions of the avionics 36 that require power from the switched power supply and distribution system are generally not operational (e.g., in the absence of the remote wake and data update functionality described herein, the avionics are not operational when the switched power supply and distribution system is switched off). In the embodiments shown in FIG. 2, for example, engine airframe interface 78, fuel sensor 80, anti-icing fluid sensor 82 and oxygen sensor 86 are generally not operational when the aircraft 8 is powered off. Data and other information on the parameters or status of the aircraft 8 based on the flight data transmitted to and stored by the data management system 14 (e.g., during operation of the gateway module 12 in the awake-on ground mode 142) will therefore be current only as of the time that the aircraft was powered off in embodiments of the type described above. Data and other information on the status of the aircraft 8 based on actions that occurred after the aircraft 8 was powered off may therefore not be available to the user from the flight data in the data management system 14. For example, data or information regarding whether or not requested post-flight maintenance such as refueling, anti-icing fluid replenishment and/or oxygen replenishment would not be determinable based on the flight data stored and/or transmitted before the aircraft 8 was powered off. Yet other information that a user might desire knowledge of prior to a flight, such as for example the current oil temperature (e.g., to determine if the engine 30 will need to be preheated prior to the flight) and the battery charge level, would similarly be unavailable from the flight data stored and/or transmitted before the aircraft 8 was powered off.

As shown in FIG. 7, when operated in the remote wake mode 140, gateway module 12 is responsive to remote information update requests. By this operation, gateway module 12 provides the user with information on the status of the aircraft 8 at the time that the user makes the update request (i.e., then-current aircraft information).

Figure 8A:
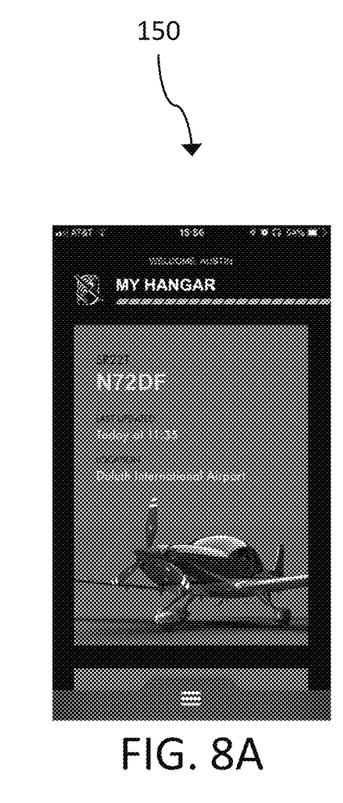
FIGS. 8A-8C illustrate screen shots of a graphical user interface of a communication device during operation of embodiments of the data storage and communication system.
Figure 8B:
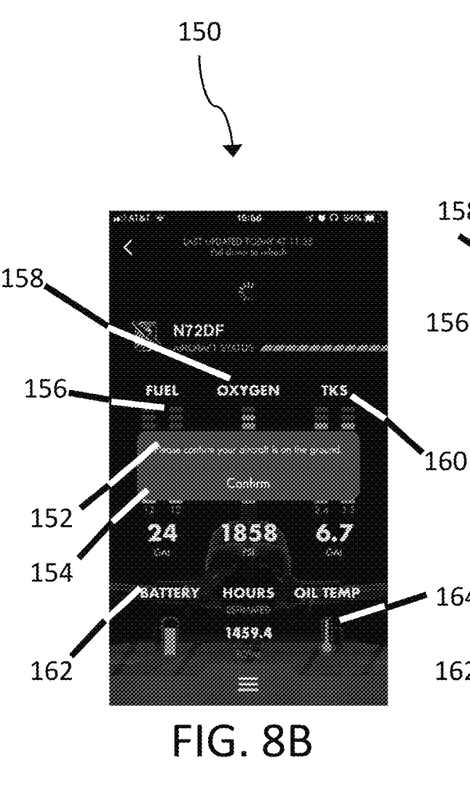

As noted above, in embodiments the user's communication device 16 includes an application or app that can be used to initiate, receive and display remote information updates. Other embodiment use other communication and interface approaches such as email, text message and/or website browser-based interfaces. FIG. 8A is an illustration of an exemplary home screen and graphical user interface (GUI) 150 that can be used in connection with embodiments, and is described in connection with the app embodiment for purposes of example. The GUI 150 includes one or more buttons or other control elements responsive to a user gesture to initiate or request the remote information update. In the illustrated embodiment, for example, the GUI 150 is configured to provide the home screen shown in FIG. 8A in a manner that can be swiped (e.g., pulled down) as the control element. FIG. 8B is an example of a screen that can be presented by the GUI 150 after the user swipes the home screen to initiate a remote information update. The illustrated embodiment includes a notice display 152 that (1) advises the user that they requested a remote information update, (2) requests that the user confirm that they wish to proceed with the remote information update, and (3) includes a control element 154 that can receive a gesture from the user to provide the requested confirmation. In the illustrated embodiment the confirmation control element 154 is a button labeled "Confirm" that can be actuated by the user.

The screen of GUI 150 shown in FIG. 8B also includes displays of certain aircraft parameters. The illustrated embodiment, for example, includes a visual fuel level display 156, a visual oxygen level display 158, a visual anti-icing fluid (TKS) level display 160, a visual battery level display 162, and a visual oil temperature level display 164. Other embodiments include alternative and/or other displays of aircraft parameter information, such as audible or textual displays. A user's request for a remote information update, such as that reflected by the screen of the GUI 150 shown in FIG. 8B, may and often will be made during a time period after the aircraft 8 has been powered off. In this situation, the data received by the communication device 16 that is used to provide the readings for the displays 156, 158, 160, 162 and 164 shown in FIG. 8B (i.e., before the remote information update is completed) may be based on information that was provided (e.g., from the gateway module 12) before the aircraft 8 was powered off, and may not be current.

In response to the user's completed initiation of the remote wake request, the app on the communication device 16 transmits an update request to the data management system 14 via one or more transmission links of the communication channels 18. Data management system 14 may process the request by performing authentication, security or other actions in embodiments. Following any such actions, the data management system 14 transmits via transmission links of the communication channels 18 a remote wake information update request to the aircraft 8. In embodiments, the remote information update request may be in the form of an SMS text message.

FIG. 7 illustrates the operation of gateway 12 in the remote wake mode 140 in accordance with embodiments. As show by step 170, the gateway 12 receives the request or command for the information update. In response to the request, gateway 12 causes power to be applied to the avionic 36 for the purpose of enabling the avionics to provide updated, then-current aircraft parameter information. In embodiments, the gateway 12 performs this action by controllably actuating the relay 40 and causing the relay to power on the remote wake bus 42 (e.g., by coupling the remote wake bus to the bus 33) as shown by step 172. Powering on the remote wake bus 42 causes the portions of avionics 36 coupled to the remote wake bus to be powered on and thereby provide updated or then-current aircraft parameter information to the gateway module 12 as shown by step 174. In the illustrated embodiments, avionics 36 will provide updated fuel level, anti-icing fluid level, oil temperature and oxygen level information (i.e., based on information from sensors 80, 82, 84 and 86). Gateway 12 causes the received updated parameter information to be transmitted to the data management system 14 by the transceiver 124 as shown by step 176 (e.g., by communication networks 18). The updated parameter information transmitted by the gateway 12 may include parameter information in addition to the information provided by the avionics 36. In the illustrated embodiments, for example, gateway 12 also causes updated battery charge level information (i.e., based on information from sensor 120) to be transmitted by the transceiver 124. Following the receipt of the updated parameter information from the avionics 36, the gateway 12 causes the power applied to the avionics 36 to be switched off. In the embodiments described above, gateway 12 takes this action by actuating the relay 40 and causing the relay to power off the remote wake bus 42 as shown by step 178.

Data management system 14 receives the updated parameter information transmitted from the aircraft 8. The updated parameter information may be stored by the data management system 14, for example in connection with a maintenance log and/or for use in connection with aircraft fleet analytics. Data management system 14 may also perform other processing operations, such as reformatting, on the received updated parameter information. The updated parameter information is transmitted by the data management system 14 to the user's communication device 16. In other embodiments, the gateway module 12 and/or communication device 16 are configured for the gateway module to receive requests for updated parameter information from sources other than the data management system 14. For example, systems such as 10 can be configured such that the gateway module 12 receives and responds to remote wake requests received directly from the communication device 16 via the communication networks 18 (e.g., the update requests transmitted by the communication device are addressed or otherwise directed to the gateway module instead of the data management system). Similarly, in other embodiments the gateway module 12 and/or communication device 16 are configured for the communication device to receive the updated parameter information from sources other than the data management system 14. For example, systems such as 10 can be configured such that the communication device 16 receives and updated aircraft parameter information directly from the gateway module 12 via the communication networks 18 (e.g., the updated parameter information is transmitted from the gateway module in a message addressed or otherwise directed to the communication device instead of the data management system).

Figure 8C:
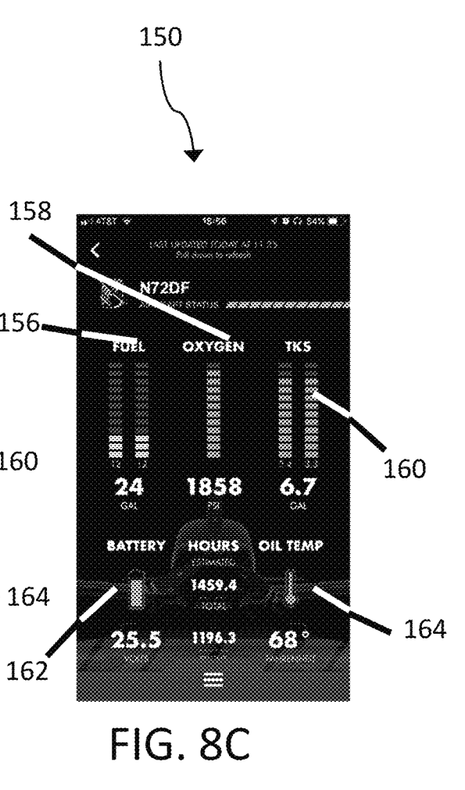

FIG. 8C is an illustration of a screen display on the GUI 150 of communication device 16 following receipt of the updated parameter information. The communication device 16 processes the received updated parameter information, and provides displays of the updated aircraft parameters. In embodiments such as that shown in FIG. 8C, the displays are the same as or similar to the fuel level display 156, oxygen level display 158, anti-icing fluid level display 160, battery charge level display 162 and oil temperature display 164 shown in FIG. 8C, but illustrating the updated and then-current values of those parameters. The updated information displayed on the screen of the GUI 150 shown in FIG. 8C may, for example, reflect maintenance such as refueling, oxygen replenishment and/or anti-icing fluid replenishment that was performed on the aircraft 8 after the aircraft was last powered off (or following a previous remote information update request). Other information on the aircraft 8 that may reflect on flight readiness, such as the battery charge level and engine oil temperature, may also be presented to the user.

As reflected in FIG. 6, gateway module 12 is responsive to remote wake requests from communication device 16 during operation in the awake-on ground mode 142 in embodiments. For example, users can initiate updated aircraft parameter information requests using the communication device 16 in manners substantially the same as or similar to those described above in connection with FIGS. 7, 8A and 8B. In embodiments, gateway module 12 can transmit updated aircraft parameter data received from avionics 36 and other sensors such as voltage sensor 120 in manners substantially the same as or similar to those described above in connection with FIG. 7. Gateway module 12 may operate in manners substantially the same as or similar to those described above in connection with FIG. 7 to collect the updated aircraft parameter information from avionics 36 in embodiments (e.g., in accordance with steps 170, 172, 174, 176 and 178). In other embodiment such as that described above where avionics 36 are already powered on (e.g., by the switched power supply and distribution system 34) during operation of the gateway module 12 in the awake-on ground mode 142, the gateway module need not and does not perform steps such as 172 and 178 to switch on and switch off the remote wake bus 42 while performing remote wake request operations during operation in the awake-on ground mode.

Figure 9:
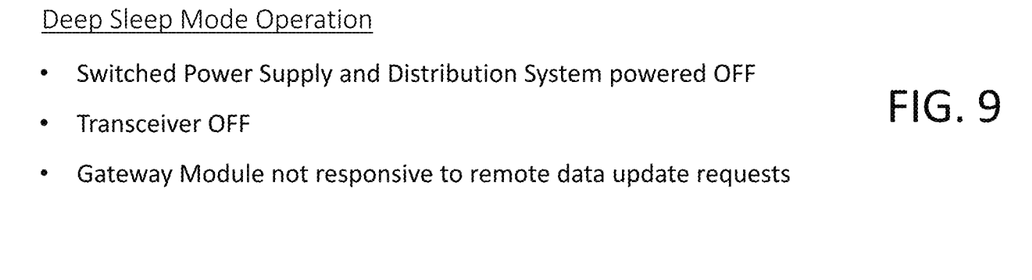
FIG. 9 describes certain operations of the gateway module in the deep sleep mode.

FIG. 9 is a diagrammatic illustration of the operation of gateway module 12 during the deep sleep mode 146 in accordance with embodiments. As shown, switched power supply and distribution system 34 and the transceiver 124 are switched or otherwise powered off during the deep sleep mode 146. Gateway module is not responsive to remote information update requests during the deep sleep mode 146. Remaining power available from the battery 32 is thereby conserved by operation of the gateway module 12 in the deep sleep mode 146.

Data storage and communications systems 10 offer significant advantages. For example, they allow a pilots and other users to obtain current information on the state of aircraft after the aircraft is powered down. These information updates can be conveniently initiated from and received on the user's mobile communication device at remote locations. The updated information can be provided with relatively low amounts of aircraft power consumption.

Inventive concepts of this application have been described above both generically and with regard to specific embodiments. It will be apparent to those skilled in the art that various modifications and variations can be made in the embodiments without departing from the spirit and scope of the disclosure. Thus, it is intended that the embodiments cover the modifications and variations of this invention provided they come within the scope of the appended claims and their equivalents.

The invention claimed is:

1. A gateway for use in an aircraft to provide aircraft parameter information updates during operation in a first mode, comprising:
   a parameter information port configured to receive aircraft parameter information from systems on the aircraft;
   a power control output port;
   a transceiver port; and
   a processing system coupled to the parameter information port, the power control output port and the transceiver port, wherein the processing system is configured to operate to:
      receive at the transceiver port a remote wake request initiated by a user of a remote communication device;
      provide power on control signals to the power control output port in response to the received remote wake request, wherein the power on control signals are configured to cause at least portions of the systems on the aircraft to power on in response to the received remote wake request by causing a first power supply to be coupled to the at least portions of the systems on the aircraft through a first power supply bus;
      receive at the parameter information port aircraft parameter information from the powered-on portions of the systems of the aircraft; and
      provide the received aircraft parameter information to the transceiver port for transmission from the aircraft, optionally to the user of the remote communication device.

2. The gateway of claim 1, wherein the processing system is further configured to provide power off control signals to the power control output port after providing the received aircraft parameter information to the transceiver port, wherein the power off control signals are configured to cause the at least portions of the systems of the aircraft to power off by causing the first power supply to be decoupled from the at least portions of the systems of the aircraft through the first power supply bus.

3. The gateway of claim 1, wherein:
   the gateway further comprises:
      a first power supply input configured to be directly coupled to a battery of the aircraft through the first power supply bus; and
      a second power supply input configured to be coupled to a switched power supply and distribution system of the aircraft; and
   the processing system is configured to provide power on control signals causing the battery to be coupled to the at least portions of the systems of the aircraft through the first power supply bus during operation of the gateway in the first mode.

4. The gateway of claim 3, and further including a relay, wherein the relay comprises:
   a supply input configured to be coupled to the first power supply through the first power supply bus;
   a control input coupled to the power control output port of the gateway; and
   a supply output configured to be coupled to the systems of the aircraft.

5. The gateway of claim 1, wherein the systems of the aircraft comprise sensors.

6. The gateway of claim 5, wherein the systems of the aircraft comprise avionics.

7. The gateway of claim 3, wherein the gateway is configured to operate in a plurality of modes including the first mode and a second mode, and wherein the processing system is further configured to:
   transition from the first mode to the second mode when the switched power supply and distribution system is powered on;
   transition from the second mode to the first mode when the switched power supply and distribution system is powered off; and
   during operation in the second mode:
      receive from the transceiver a remote wake request initiated by a user of a remote communication device;
      not cause the battery to be coupled to the avionics through the first power supply bus;
      receive aircraft parameter information from the powered-on portions of the systems of the aircraft; and
      provide the received aircraft parameter information to the transceiver port for transmission from the aircraft.

8. The gateway of claim 7, wherein the gateway causes flight data from the systems of the aircraft to be logged when the gateway is operating in the second mode.

9. The gateway of claim 7, wherein the gateway is further configured to operate in a third mode, and wherein the processing system is further configured to:
   transition from the first mode to the third mode when a low battery supply condition is identified; and
   not power on the portions of the systems of the aircraft during operation in the third mode.

* * * * *